United States Patent [19]

Guenther

[11] 4,165,760

[45] Aug. 28, 1979

[54] AIR CHUCK

[76] Inventor: Manfred H. Guenther, Rte. #2, Box 290T, Belton, Mo. 64012

[21] Appl. No.: 842,406

[22] Filed: Oct. 17, 1977

[51] Int. Cl.² ........................................... F16K 15/20
[52] U.S. Cl. ............................. 137/231; 251/149.1; 251/149.7
[58] Field of Search ............... 137/223, 231; 251/149, 251/149.1, 149.6, 149.7

[56] References Cited

U.S. PATENT DOCUMENTS

| | | | |
|---|---|---|---|
| 1,390,283 | 9/1921 | Edelmann | 137/231 |
| 1,806,983 | 5/1931 | Norgren | 137/223 |
| 2,166,874 | 7/1939 | Mouziugo | 137/231 X |
| 2,297,548 | 9/1942 | Fox | 251/149.6 X |
| 4,017,057 | 4/1977 | Strybel | 251/149.1 |

*Primary Examiner*—Harold W. Weakley

*Attorney, Agent, or Firm*—John A. Hamilton

[57] ABSTRACT

An air chuck fitting to be attached to a flexible pressurized air hose for providing a manual press-fitted connection to the valve stem of an automobile tire or the like, and consisting of a tubular body member attachable to the hose end and having a pressure-seated plunger valve therein, the plunger valve having a plunger extension which, when pressed over the valve stem of an automobile tire, opens both the plunger valve and the air valve of the stem to admit air to the stem, the invention being characterized by the construction of the body member, hose and plunger valve assembly, wherein a single assembly member performs the functions of providing a sealed connection of the hose to the body member, limiting and controlling the motion of the plunger valve, and providing for air passage from the hose to the plunger valve.

2 Claims, 5 Drawing Figures

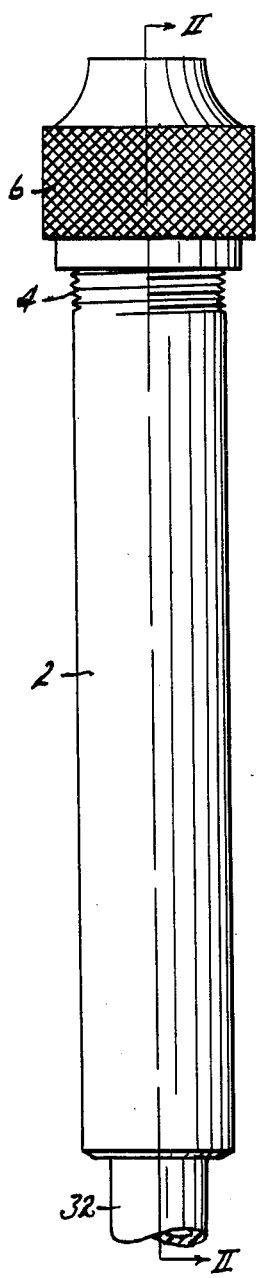
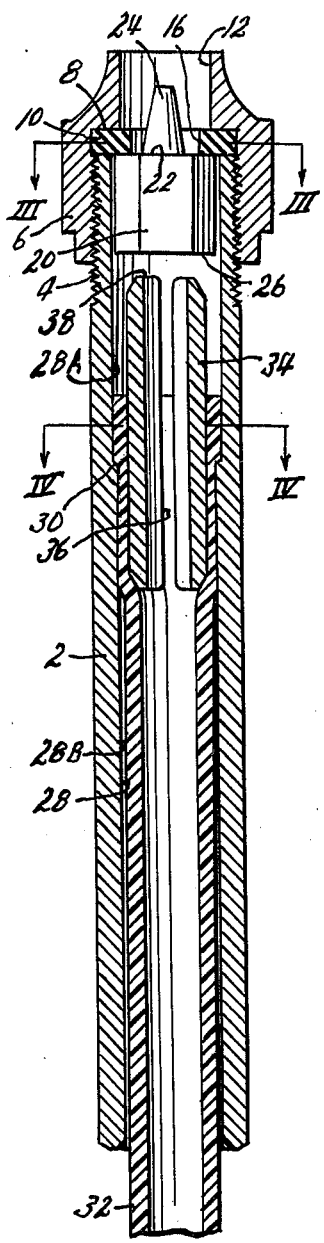
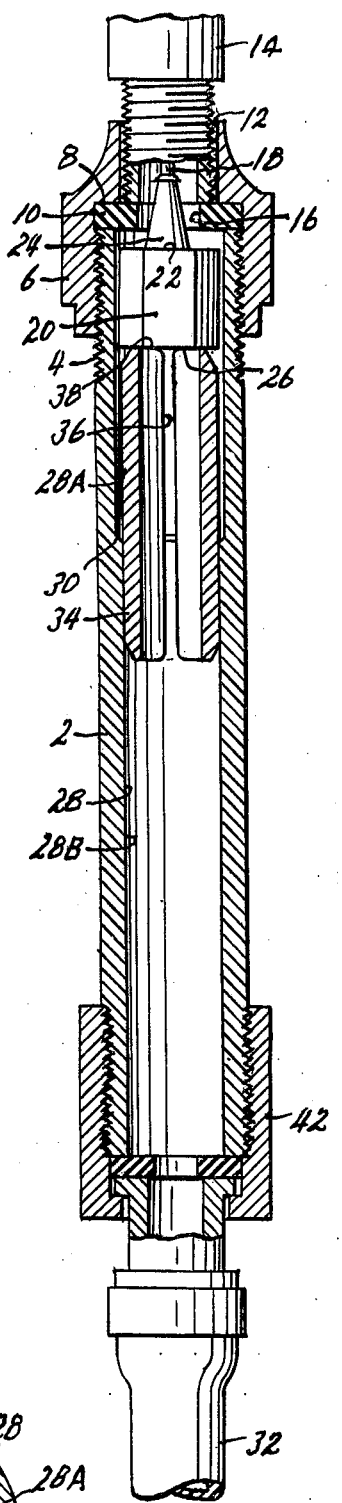
Fig. 1    Fig. 2    Fig. 3    Fig. 4    Fig. 5

AIR CHUCK

This invention relates to new and useful improvements in air chucks, and has particular reference to the class of air chucks commonly applied to the ends of pressurized air hoses and operable to be manually press-fitted to the valve stems of automobile tires for the purpose of inflating said tires. The chuck must contain a pressure-sealed valve for normally retaining air pressure in the hose, and the tire valve stem must contain a pressure-sealed valve for normally retaining air pressure in the tire. Application of the chuck to the stem must open both valves to permit air to flow into the tire, and also provide a sealed connection between the chuck and stem to prevent the escape of air to the atmosphere. Air chucks of this type are also commonly used for supplying pressurized air to vessels other than automobile tires, but which are fitted with filling stems similar to those used on automobile tires.

Air chucks of this general type have heretofore been rather complicated structures, both as to their connections to the hose, and as to the construction and operation of the air valve included therein, involving numerous parts, often involving numerous machine operations to produce, and being tedious and time-consuming to assemble. The provision of an air chuck which is fully operative and efficient in an operational sense, but which is nevertheless greatly simplified and economical in manufacture and assembly, is the overall object of the present invention.

More specifically, an object of the present invention is the provision of an air chuck including a body member adapted to be interconnected to an air hose, a normally closed valve preventing escape of air from the body member, but having a plunger projection which, when the chuck is applied to the valve stem of an automobile tire, functions to open both the body member valve and also the usual stem valve of the tire stem, and a single assembly member with the plural functions of sealing the connection of the hose into the body member, controlling the operation of the plunger valve of the body member, and providing air passageways as required.

Another object is the provision of an air chuck of the general character described wherein said assembly member is adjustable to provide optimum operation of the chuck under all conditions.

With these objects in view, as well as other objects which will appear in the course of the specification, reference will be had to the accompanying drawing, wherein:

FIG. 1 is a side elevational view of an air chuck embodying the present invention, shown operatively applied to an air hose, FIG. 2 is a sectional view taken on line II—II of FIG. 1, FIG. 3 is an enlarged sectional view taken on line III—III of FIG. 2, FIG. 4 is an enlarged sectional view taken on line IV—IV of FIG. 2, and FIG. 5 is a view similar to FIG. 2, but showing a slightly modified construction, and showing the chuck operatively applied to the fragmentarily illustrated valve stem of an automobile tire.

Like reference numerals apply to similar parts throughout the several views, and the numeral 2 applies to the body member of an air chuck embodying the present invention. Said body member is tubular and is formed of metal or other rigid material, being externally threaded at one end, as indicated at 4, to receive thereon an internally threaded tubular cap 6. Said cap is provided with an internal shoulder 8 which faces toward the body member, and an annular sealing ring 10 of rubber or other soft, resilient material is clamped at its edges between shoulder 8 and the end surface of the body member to provide an airtight seal therebetween. Outwardly from sealing ring 10, the bore 12 of cap 6 is of such diameter as to be slidably engageable over the free portion of the valve stem 14 of an automobile tire, as indicated in FIG. 5. When cap 6 is pressed firmly over the valve stem, as shown, the stem is pressed firmly against sealing ring 10, around the central aperture 16 of said sealing ring, to provide an airtight seal. It will be understood that stem 14 includes an internal valve, not shown, having an operating spindle 18 disposed axially in the free end portion of the stem. The stem valve is normally held closed, to prevent leakage of air from the tire with which the stem communicates, but may be opened by inward pressure on spindle 18. FIG. 5 shows said spindle depressed to open the stem valve.

Disposed in body member 2 adjacent sealing ring 10 is a plunger valve 20 which is solid and is hexagonal in cross-sectional contour as indicated in FIG. 3, coaxially with the body member. It is freely slidable axially of the body member, its hexagonal shape permitting free passage of air thereabout. The end thereof closest to sealing ring 10 is reduced to form a shoulder 22 normal to its axis and capable of seating against said sealing ring around the entire periphery of central aperture 16 of the latter, and an axially projecting plunger 24 which extends through central aperture 16 of the sealing ring into bore 12 of the cap. The end surface 26 of the plunger valve opposite shoulder 22 thereof is also flat and normal to its axis. The internal bore 28 of body member 2 is provided with a section 28A of larger diameter at the capped end thereof, which contains plunger valve 20 and extends inwardly a substantial distance from said valve, and a section 28B of somewhat smaller diameter which extends to the opposite end of the body member, the two bore sections meeting at a bevelled shoulder 30.

A flexible air hose 32, formed of rubber, plastic or other flexibly resilient material is connected into the end of body member 2 opposite from cap 6 to deliver pressurized air from any suitable source, not shown, to the chuck and thence to valve stem 14. In the species of the chuck shown in FIGS. 1–4, the hose 32, which has an external diameter sufficiently small to pass slidably through bore section 28B of the body member but capable of being resiliently expanded to a diameter greater than that of said bore, is sealed in the body member as follows: With cap 6, sealing ring 10 and plunger valve 20 removed, hose 32 is pushed upwardly, as shown in FIG. 2, through the body member to project upwardly beyond the threaded end of said body member, and a back-up member constituting "roll-tube" 34 is inserted slidably into the upwardly projecting end of said hose, with a portion of said tube projecting from said hose. Said "roll-tube" consists of a sheet of spring steel or the like rolled into a tubular form, but with the longitudinally extending edges thereof slightly spaced apart to form a slot 36 therebetween. Said tube has a normal external diameter sufficiently great that when said tube is inserted into the hose as just described, it expands said hose to an external diameter greater than that of body member bore 28. The hose, with the roll-tube inserted, is then drawn downwardly through the body member until the upper free end surface 38 of the roll-tube is spaced inwardly from the top end of the body member by a distance somewhat greater than the axial length of the hexagonal portion of the plunger valve. During this movement, the roll-tube is resiliently compressed to a smaller diameter, and the resultant expanding force of said tube compresses the hose wall firmly against the internal wall of the body member, thereby providing an airtight seal therebetween, and also providing a fully adequate and secure structural connection of the hose to the body member. The roll-tube preferably extends partially below the internal shoulder 30 of the body member, in order to provide a tighter air seal of the hose wall against the smaller bore section 28B of the body member. However, the shoulder 30 is not particularly important in this form of the invention, since the hose may be moved into sealing contact with the bore wall both above and below said shoulder.

The plunger valve 20 may then be reinserted, and sealing ring 10 and cap 6 reapplied.

In operation, it will be seen that normally, when the chuck is not applied to an automobile tire valve stem 14, shoulder 22 of plunger valve 20 is urged by the air pressure in hose 32 into sealing engagement with the inner surface of sealing ring 10, thereby to prevent escape of air from the chuck. This condition is illustrated in FIG. 2. To supply air to the tire, the chuck is pressed coaxially over the valve stem 14, as shown in FIG. 5, until the outer end of said valve stem seals against the outer surface of sealing ring 10, the valve stem slidably entering the reduced portion 12 of the bore of cap 6. During the final portion of this movement, the plunger 24 of valve 20 depresses spindle 18 of the valve stem, whereby to open the stem valve, and spindle 18 depresses plunger 24 to unseat surface 22 of plunger valve 20 from the inner surface of sealing ring 10, whereby the plunger valve is opened, and air flows to the tire, the flow of air around valve 20 being permitted by the passages provided by its hexagonal cross-sectional contour.

Since both the stem valve and also chuck valve 20 are normally retained in their closed positions by air-pressure, there would exist the possibility, depending on the relative valve areas and air pressures involved, that when the chuck is applied to the valve stem as above described, one valve but not the other would open, with a resultant failure of air delivery to the tire, unless means are provided to prevent it. Both valves are provided with "back-up" means for this purpose, which provide positive mechanical opening of the valves when necessary. The valve stem valve spindle 18 has a "bottoming-out" position, or a position of maximum depression beyond which it cannot be depressed. This position is at a position of at least slightly greater depression than shown in FIG. 5, in order that it cannot interfere with the sealing contact of the valve stem against the outer surface of sealing ring 10. The axial length of plunger 24 must be in excess of a distance equal to the maximum depression of spindle 18, plus the thickness of the sealing ring, in order that if the plunger valve 20 is not unseated as the chuck is applied, spindle 18, after it reaches its position of maximum depression, reacts mechanically against plunger 24 to unseat valve 20 positively. This "bottoming-out" of spindle 18 is a standard provision in automobile valve stems, and is not here shown in detail.

On the other hand, if valve 20 opens but the stem valve does not, as the chuck is initially applied, the back-up member 34, during the final movement of applying the chuck, engages the inner end surface 26 of valve 20, applying mechanical force thereto, and thence to the stem valve spindle, to open the stem valve positively. To insure proper functioning of back-up member 34 in this respect, the normal spacing between the outer end 38 of tube 34 from end surface 26 of valve 20, when valve 20 is closed, must be less than the normal extension of plunger 24 beyond the outer surface of sealing ring 10. Otherwise the chuck could be fully applied as in FIG. 5 with the stem valve still closed. Thus when the chuck is fully applied as in FIG. 5, both the stem valve and the chuck valve are open, being opened by positive mechanical force if necessary. It therefore becomes apparent that the position of roll-tube 34 in body member 2, relative to valve 20, is important to the proper functioning of the chuck. The axial slidability of the roll-tube in hose 32, by the application of substantial force thereto provides the adjustability to meet this requirement. The adjustment may be made by gauge or the like when initially assembling the parts, and can be further adjusted if malfunctioning occurs. The C-shaped cross-sectional contour of tube 34, and the resultant slot 36, provides free passage for the escape of air from the tube to the body member bore surrounding it, so long as the tube projects outwardly from the end of hose 32. This prevents any possibility that when the tube is seated against the surface 26 of valve 20, said valve could block or impede the flow of air to the tire.

The back-up member formed by roll-tube 34, and its relationship to the remaining elements, is considered to be the central feature of the present invention. It has several functions:

1. It connects hose 32 structurally into body member 2, providing an airtight sealed connection, 2. It provides a back-up for plunger valve 20 allowing said valve to open the stem valve of the tire valve stem by positive mechanical force if necessary.

3. It is adjustable as required in its back-up function.

4. By its special shape, it provides a positive air passage thereby at all times.

The FIG. 5 species of the invention is identical to that shown in FIGS. 1-4, corresponding elements being designated by corresponding numerals, except that hose 32, instead of being sealed in body member 2 by roll-tube 34, is connected to the outer end of the body member by a union-type sealed connector 42, or any other suitable means. In this case, roll-tube 34 is of slightly larger diameter in order to fit tightly in the reduced portion 28B of body member bore 28. In this form of the invention the shoulder 30 of bore 28 is important, tube relying for support and axial adjustability on its frictional engagement in smaller bore section 28B, but extending into larger bore section 28A, the larger diameter of the latter providing an annular air passage into which air may escape from tube 34 through slot 36. The operation of the FIG. 5 species is otherwise identical to that shown in FIGS. 1-4, roll-tube 34 having all of the functions listed for it in FIGS. 1-4 except the sealing of the hose into the body member.

While I have shown and described certain specific embodiments of my invention, it will be readily apparent that many minor changes of structure and operation could be made without departing from the spirit of the invention.

What I claim as new and desire to protect by Letters Patent is:

1. An air chuck for delivering air from a pressurized air hose formed of resiliently compressible material to the valve stem of an automobile tire, said stem being tubular and including therein a stem valve having an operating spindle extending axially in the mouth of said stem and operable to open said stem valve responsively to inward movement thereof, said air chuck comprising:

a. a tubular body member, said air hose extending slidably into one end of said body member,
   b. means providing a sealed connection of said air hose into said body member,
   c. an annular sealing ring sealed around its outer edge in the opposite end of said body member, and operable to engage around the central aperture thereof against the mouth of said valve stem when pressed manually thereagainst, to provide a sealed interconnection between said body member and said stem,
   d. a plunger valve disposed for axial sliding movement in said body member inwardly of said sealing ring, said plunger valve normally being pressed against said sealing ring by air pressure in said body member to engage said ring around the central aperture thereof, and including a plunger projecting outwardly through the central aperture of said sealing ring, whereby as said sealing ring is pressed against said valve stem, said plunger engages and depresses said stem valve, and said spindle reacts against said plunger to open said plunger valve, and
   e. a back-up member normally fixed in said body member inwardly of said plunger valve and operable to engage and prevent further inward movement of said plunger valve after said valve is opened by disengagement thereof from said sealing ring, whereby during final movement of said body member toward said valve stem, said plunger is advanced against said spindle by positive mechanical force to insure opening of said stem valve, said back-up member comprising a tube formed of resiliently flexible material and being of C-shaped cross-sectional contour with its longitudinal edges spaced apart to form a longitudinal slot in the wall thereof, said back-up tube being resiliently compressible for insertion into the inner end of said hose within said body member, whereby resilient expansion thereof compresses the wall of said tube against the bore of said body member, said back-up tube projecting from the inner end of said air hose toward said plunger valve, and serving as said means providing sealed connection of said hose into said body member.

2. An air chuck as recited in claim 1 wherein said back-up tbe is slidably movable in said hose when resiliently compressed, in order to adjust the spacing of the projecting end thereof from said plunger valve, whereby it may be set to engage the plunger valve at the proper point in the relative movement of said body member and said valve stem to insure that both said stem valve and said plunger valve will be open when said sealing ring is moved into sealing engagement with the mouth of said valve stem.

* * * * *